United States Patent
Biernacki et al.

(10) Patent No.: US 11,055,178 B2
(45) Date of Patent: Jul. 6, 2021

(54) METHOD AND APPARATUS FOR PREDICTING ERRORS IN TO-BE-DEVELOPED SOFTWARE UPDATES

(71) Applicant: EMC IP HOLDING COMPANY LLC, Hopkinton, MA (US)

(72) Inventors: David Biernacki, Woonsocket, RI (US); Debra Robitaille, Hopkinton, MA (US); Mark Adam Arakelian, Shirley, MA (US); Venkat Reddy, Bangalore (IN); Belagapu Kumar, Bangalore (IN); Suhas K B, Bangalore (IN); Tamilarasan Janakiraman, Hosur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 136 days.

(21) Appl. No.: 16/543,712

(22) Filed: Aug. 19, 2019

(65) Prior Publication Data
US 2021/0055995 A1 Feb. 25, 2021

(51) Int. Cl.
*G06F 11/14* (2006.01)
*G06F 11/07* (2006.01)
(Continued)

(52) U.S. Cl.
CPC ............ *G06F 11/1433* (2013.01); *G06F 8/65* (2013.01); *G06F 11/0766* (2013.01);
(Continued)

(58) Field of Classification Search
CPC ............ G06F 8/60–71; G06F 11/3664; G06F 11/3668; G06F 11/3688; G06F 11/3692;
(Continued)

(56) References Cited

U.S. PATENT DOCUMENTS

| 8,539,438 B2 * | 9/2013 | Bassin | G06Q 30/00 717/101 |
| 8,621,417 B2 * | 12/2013 | Kaulgud | G06F 8/77 717/102 |

(Continued)

OTHER PUBLICATIONS

Davis, J., Coding in the Rain, Jul. 8, 2013, 5 pages, [retrieved on Feb. 26, 2021], Retrieved from the Internet: <URL:http://drjasondavis.com/blog/2013/07/08/coding-in-the-rain>.*

(Continued)

*Primary Examiner* — Geoffrey R St Leger
(74) *Attorney, Agent, or Firm* — Anderson Gorecki LLP

(57) ABSTRACT

A method of providing an error occurrence estimate for a proposed software update, before the proposed software update is created, includes training a learning process to cause the learning process to learn a correlation between the complexity of the previous software updates and the error occurrences of the previous software updates. The complexity information may include the number of lines of code and the number of check-in operations that occurred in connection with creation of the previous software updates. The trained learning process is then provided with expected complexity information of a proposed software update, and used to generate an error estimate including the number of errors that are likely to occur, the severity of the errors that are likely to occur, and the amount of software developer time that should be expected to be incurred to correct the errors.

19 Claims, 5 Drawing Sheets

(51) Int. Cl.
*G06K 9/62* (2006.01)
*G06F 8/65* (2018.01)
*G06N 20/00* (2019.01)
*G06N 3/08* (2006.01)
*G06F 11/36* (2006.01)

(52) U.S. Cl.
CPC ...... *G06F 11/0793* (2013.01); *G06F 11/1417* (2013.01); *G06F 11/3664* (2013.01); *G06F 11/3668* (2013.01); *G06K 9/6256* (2013.01); *G06K 9/6276* (2013.01); *G06N 3/08* (2013.01); *G06N 20/00* (2019.01)

(58) Field of Classification Search
CPC ............ G06F 11/0766; G06F 11/0793; G06F 11/1417; G06F 11/1433; G06K 9/6256; G06K 9/6276; G06N 20/00; G06N 3/08
USPC .................................. 717/124–126, 168–178
See application file for complete search history.

(56) References Cited

U.S. PATENT DOCUMENTS

| | | | | |
|---|---|---|---|---|
| 8,713,513 | B2* | 4/2014 | Sarkar | G06F 11/3616 717/101 |
| 9,448,787 | B2* | 9/2016 | Rosomoff | G06F 11/3668 |
| 10,175,979 | B1* | 1/2019 | Elwell | G06F 8/71 |
| 2005/0210440 | A1* | 9/2005 | Lake | G06Q 10/06 717/101 |
| 2008/0155508 | A1* | 6/2008 | Sarkar | G06F 11/3616 717/126 |
| 2012/0317541 | A1* | 12/2012 | Kaulgud | G06F 11/3604 717/102 |
| 2013/0311968 | A1* | 11/2013 | Sharma | G06F 11/3692 717/101 |
| 2014/0317591 | A1* | 10/2014 | Rosomoff | G06F 8/70 717/101 |
| 2015/0355998 | A1* | 12/2015 | Kogan-Katz | G06F 8/71 717/101 |
| 2018/0267886 | A1* | 9/2018 | Durga | G06F 11/3616 |

OTHER PUBLICATIONS

Hewett, R., et al., On modeling software defect repair time, Empirical Software Engineering vol. 14, Article No. 165 (2009), 22 pages, [retrieved on Feb. 26, 2021], Retrieved from the Internet: <URL:https://link.springer.com/article/10.1007/s10664-008-9064-x>.*

Gaffney, John E., Estimating the Number of Faults in Code, IEEE Transactions on Software Engineering, vol. SE-10, Issue: 4, Jul. 1984, pp. 459-464, [retrieved on Feb. 24, 2021], Retrieved from the Internet: <URL:http://ieeexplore.IEEE.org/>.*

Ottenstein, L., et al., Predicting the Number of Bugs Expected in a Program Module, Purdue University, Purdue e-Pubs, Report No. 76-205, 1976, 21 pages, [retrieved on Feb. 25, 2021], Retrieved from the Internet: <URL:https://docs.lib.purdue.edu/cgi/viewcontent.cgi?article=1145&context=cstech>.*

* cited by examiner

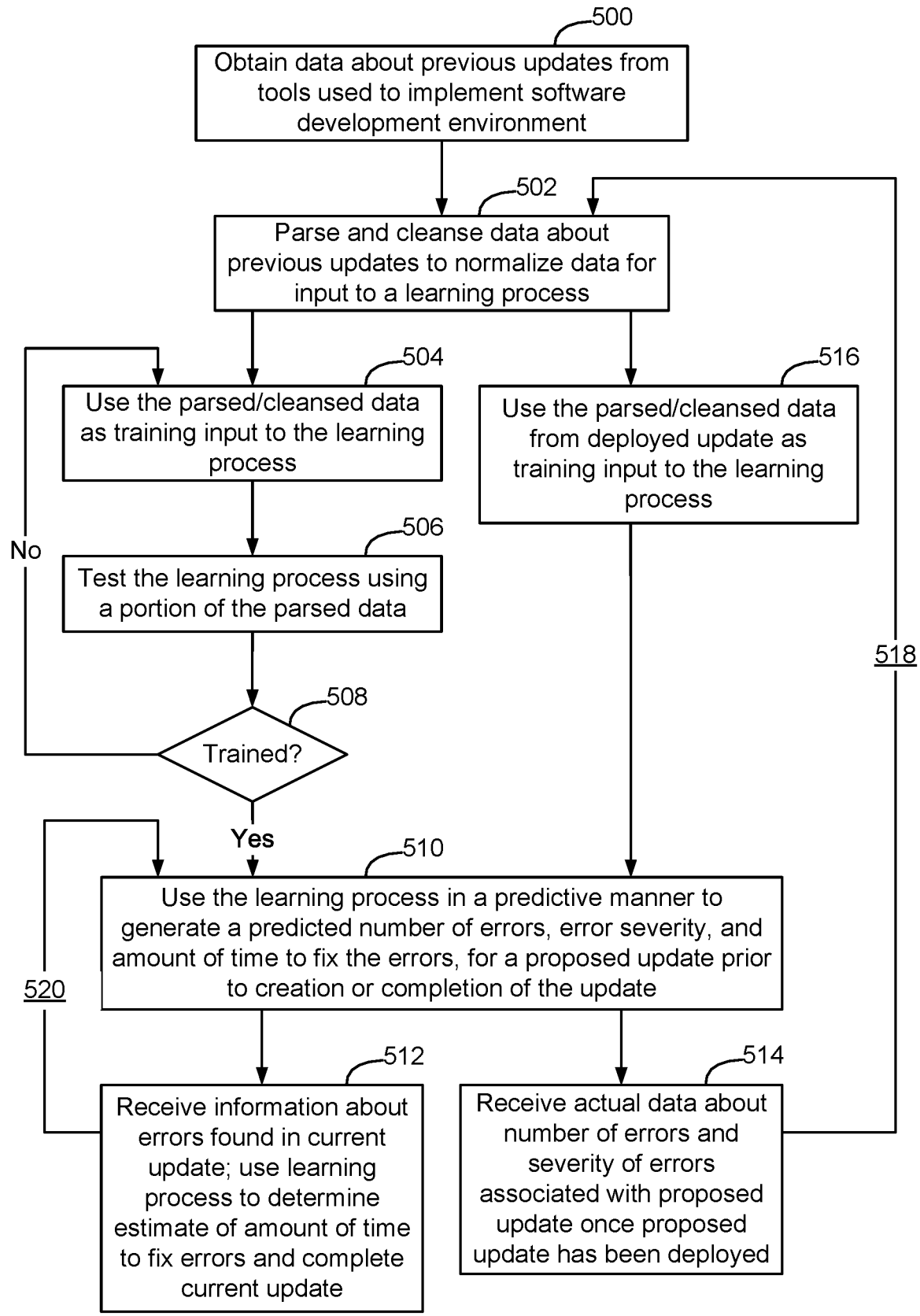

METHOD AND APPARATUS FOR PREDICTING ERRORS IN TO-BE-DEVELOPED SOFTWARE UPDATES

BACKGROUND

This disclosure relates to computing systems and related devices and methods, and more particularly, to a method and apparatus for predicting several errors that are likely to occur and the severity of the errors that are likely to occur in a software update before the software update is created.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A method of providing an error occurrence estimate for a proposed software update, before the proposed software update is created, includes training a learning process to cause the learning process to learn a correlation between the complexity of the previous software updates and the error occurrences of the previous software updates. The complexity information may include the number of lines of code and the number of check-in operations that occurred in connection with creation of the previous software updates. The trained learning process is then provided with expected complexity information of a proposed software update, and used to generate an error estimate including the number of errors that are likely to occur, the severity of the errors that are likely to occur, and the amount of software developer time that should be expected to be incurred to correct the errors.

In some embodiments, a non-transitory tangible computer readable storage medium is provided, which has a computer program stored thereon for implementing a method of predicting a number of errors that are likely to occur and severity of the errors that are likely to occur in a proposed software update before the proposed software update is created. The computer program comprising a set of instructions which, when executed by a computer, cause the computer to perform a method including the steps of receiving data from a plurality of tools of a software development environment, the data including at least complexity information of previous software updates and error occurrence information of the previous software updates, and using the data to train a learning process, to cause the learning process to learn a correlation between the complexity information of the previous software updates and the error occurrence information of the previous software updates. The method further includes providing the trained learning process with an expected complexity information of the proposed software update, and receiving from the trained learning process the number of errors that are likely to occur and severity of the errors that are likely to occur while of creating the proposed software update before the proposed software update is created.

In some embodiments, the plurality of tools includes a requirement tracker tool having a first database, an error reporting tool having a second database, and a testing automation tool having a third database, and wherein the data is received from each of the first database, second database, and third database. In some embodiments, the step of receiving data from the plurality of tools comprises cleansing the data prior to using the data to train the learning process. In some embodiments, the learning process implements a k-nearest neighbors linear regression algorithm.

In some embodiments, the complexity information of the previous software updates includes, for each previous software update that is used to train the learning process, a number of lines of code of the previous software update and a number of check-in operations that occurred in connection with creation of the previous software update. In some embodiments, the error occurrence information includes, for each previous software update that is used to train the learning process, a number of errors that occurred in connection with creation of the previous software update, information about the severity of the errors that occurred in connection with creation of the previous software update, and an amount of time required to correct the errors that occurred in connection with creation of the previous software update.

In some embodiments, the expected complexity information includes an expected number of lines of code of the proposed software update and an expected number of check-in operations that are anticipated to occur in connection with creation of the proposed software update. In some embodiments, the step of receiving, from the trained learning process, the number of errors that are likely to occur and severity of the errors that are likely to occur, further comprises receiving, from the trained learning process, an estimate of an amount of time required to correct errors that are anticipated to occur in connection with creation of the proposed software update.

In some embodiments, the complexity information of the previous software updates includes, for each previous software update that is used to train the learning process, first developer information identifying who worked on the previous software update, and the expected complexity information includes second developer information identifying which software developers are expected to work on the proposed software update.

In some embodiments, the step of using the data to train the learning process comprises using the first developer information to train the learning process to learn a correlation between developer information and error occurrence information, and wherein the trained learning process uses the learned correlation between developer information and error occurrence information, and the second developer information, to generate the number of errors that are likely to occur and the severity of the errors that are likely to occur while creating the proposed software update.

In some embodiments, the method further includes the step of providing the trained learning process with second expected complexity information of the proposed software update after creation of the proposed software update has been started, and receiving from the trained learning process a revised expected number of errors that are likely to occur and severity of the errors that are likely to occur while finishing the proposed software update.

In some embodiments, the step of receiving, from the trained learning process, the revised expected number of errors that are likely to occur and severity of the errors that are likely to occur, further comprises receiving, from the trained learning process, an estimate of time required to correct errors that are anticipated to occur in connection with finishing the proposed software update.

In some embodiments, the method further includes the step of generating, by the trained learning process, an error estimate, the error estimate including the number of errors that are likely to occur and severity of the errors that are likely to occur while of creating the proposed software update before the proposed software update is created. In some embodiments, the error estimate further includes an estimated amount of software developer time that is likely to be required to fix the errors that are likely to occur while creating the proposed software update.

In some embodiments, a method includes receiving data from a plurality of tools of a software development environment, the data including at least complexity information of previous software updates and error occurrence information of the previous software updates, and training a learning process, using the data, to cause the learning process to learn a correlation between the complexity information of the previous software updates and the error occurrence information of the previous software updates. The method further includes receiving, by the trained learning process, an expected complexity information of the proposed software update, and generating, by the trained learning process, an error estimate for the proposed software update before the proposed software update is created, the error estimate including a number of errors that are likely to occur and severity of the errors that are likely to occur while creating a proposed software update.

In some embodiments, the error estimate further includes an estimated amount of software developer time that is likely to be required to fix the errors that are likely to occur while creating the proposed software update. In some embodiments, the learning process implements a k-nearest neighbors linear regression algorithm.

In some embodiments, the complexity information of the previous software updates includes, for each previous software update that is used to train the learning process, a number of lines of code of the previous software update and a number of check-in operations that occurred in connection with creation of the previous software update. In some embodiments, the error occurrence information includes, for each previous software update that is used to train the learning process, a number of errors that occurred in connection with creation of the previous software update, information about the severity of the errors that occurred in connection with creation of the previous software update, and an amount of time required to correct the errors that occurred in connection with creation of the previous software update.

BRIEF DESCRIPTION OF THE DRAWINGS

FIG. 5 is a flow chart of aspects of a process of training and using a machine learning process of an error estimation system, to predict several errors that are likely to occur and the severity of the errors that are likely to occur in a software update before the software update is created, according to some embodiments.

DETAILED DESCRIPTION

Figure 1:
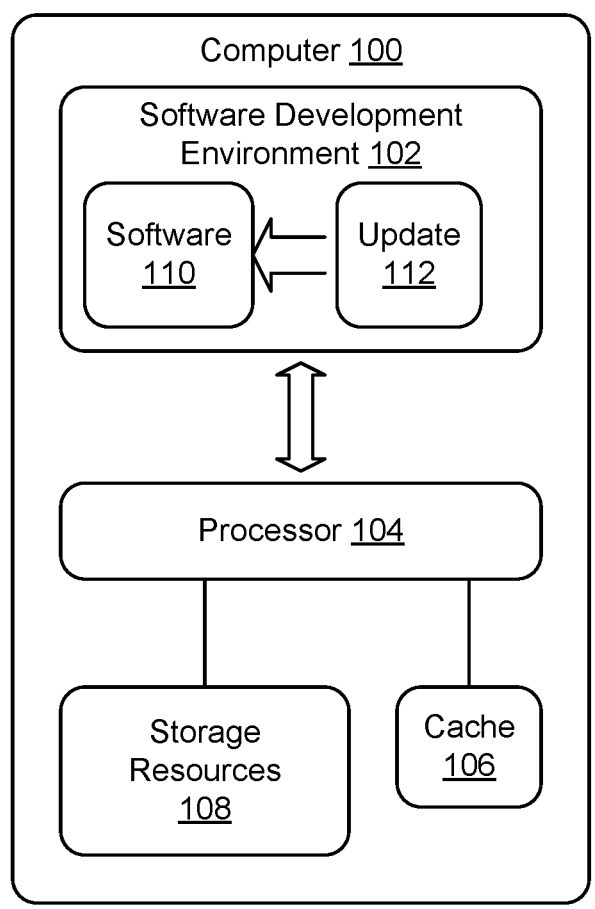
FIG. 1 is a functional block diagram of an example computer system implementing a software development environment, according to some embodiments.

FIG. 1 shows an example computer system 100, in which a software development environment 102 is executing on one or more processors 104. As shown in FIG. 1, the processors 104 have access to cache 106 and storage resources 108. In some embodiments, the cache 106 and storage resources 108 are examples of a non-transitory tangible computer readable storage medium. In some embodiments, as discussed in greater detail below, one or more computer programs are stored on the non-transitory tangible computer readable storage medium that include sets of instructions which, when executed by the computer 100, cause the computer 100 to perform a method of predicting a number of errors that are likely to occur and the severity of the errors that are likely to occur in a proposed software update before the software update is created. Example computers include laptop computers, desktop computers, servers, virtual computers accessed over a network, or other sorts of processing environments capable of supporting software development environment 102.

Although FIG. 1 shows an embodiment in which a single computer is shown as implementing the software development environment 102, often aspects of the software development environment 102 are implemented using separate computers or separate computing environments that interact with each other. For example, a Cloud Based computing platform may be used to implement the software development environment 102 in which multiple servers resident on a network are accessed and used to implement the software development environment 102. Accordingly, the invention is not limited to an implementation that uses a single computer, as shown in FIG. 1, and this figure is merely intended to help provide context for understanding the concepts discussed in greater detail herein.

In computer program and software product development, a software development environment 102 is a set of processes and programming tools used to create the program or software product. An integrated development environment is a software development environment in which the processes and tools are coordinated to provide software developers an orderly interface to and convenient view of the development process (or at least the processes of writing code, testing it, and packaging it for deployment).

As shown in FIG. 1, in some embodiments the software development environment is configured to be used to create and maintain software 110. For example, updates 112 to software 110 may be created using the software development environment 102 to enable software 110 to continue to change over time.

The term "update", as used herein, refers to any change to software 110. Example changes may include new creation of software 110, as well as changes related to corrective maintenance, adaptive maintenance, perfective maintenance, and/or preventative maintenance. Corrective maintenance is concerned with fixing errors that are observed when the software is in use. Adaptive maintenance is concerned with the changes in the software that takes place to make the software adaptable to a new environment such as to enable the software to run on a new operating system. Perfective maintenance is concerned with the changes to the software that occur while adding new functionalities in the software. Preventive maintenance involves implementing changes to prevent the occurrence of errors. Many different names may be used for different types of software creation, enhancement, or modification, which may depend on the specific lingo used by the particular software development team. For purposes of this description, the term "update" is intended to be generic to refer to any software change or original software product that is created using the software development environment 102.

Figure 2:
FIG. 2 is a functional block diagram of an example software development environment, according to some embodiments.

FIG. 2 shows an example set of tools of an example software development environment 102. Other software development environments 102 may include different sets of tools, additional tools, or fewer tools, depending on the implementation. Likewise, in some software development environments 102, the functions of one or more of the tools shown in FIG. 2 may be combined. Accordingly, many different implementations of a software development environment 102 may be envisioned, which will often depend on the type of software 110 and the preferences of the development team. The embodiment shown in FIG. 2 is merely intended as an example, to help explain some implementations.

As shown in FIG. 2, in some embodiments the software development environment 102 includes a source code management tool 120. One example source code management tool 120 is "git", available from www.github.com, which is a free and open source distributed version control system designed to manage source code version control. Other source code management tools 120 may be used as well, depending on the implementation, and the invention is not limited to an embodiment that interfaces with a software development environment 102 configured to use git as the source code management tool 120.

In some embodiments, the software development environment 102 includes a code coverage tool 130 that is configured to perform static analysis of the source code, for example to look for security risks. One example code coverage tool 130 is Coverity, from Synopsys. Other code coverage tools 130 may be used as well, depending on the implementation, and the invention is not limited to an embodiment that interfaces with a software development environment 102 configured to use Coverity as the code coverage tool 130.

In some embodiments the software development environment 102 includes an error reporting tool 140, configured to log and document errors that are detected in the source code 114, update 112, or interaction between update 112 and source code 114. An example error reporting tool 140 is Jira, from Atlassian, which is designed to provide bug tracking and agile project management. In some embodiments, the error reporting tool 140 is configured as a project management tool/software that includes a database 142 (see FIG. 4) that contains the information about the reported bugs. Other error reporting tools 140 may be used as well, depending on the implementation, and the invention is not limited to an embodiment that interfaces with a software development environment 102 configured to use Jira as the error reporting tool 140.

In some embodiments, the software development environment 102 includes a requirement tracker tool 150, configured to keep track of changes (updates 112) that need to be made to the software 110. An example requirement tracker tool 150 is Rally, available from Rally Software. The requirement tracker tool 150 enables updates to be planned and coordinated, for example to ensure that dependent updates are implemented in the correct order, and to enable relative priority of the various updates to be visualized. Other requirement tracker tools 150 may be used as well, depending on the implementation, and the invention is not limited to an embodiment that interfaces with a software development environment 102 configured to use Rally as the requirement tracker tool 150.

Figure 3:
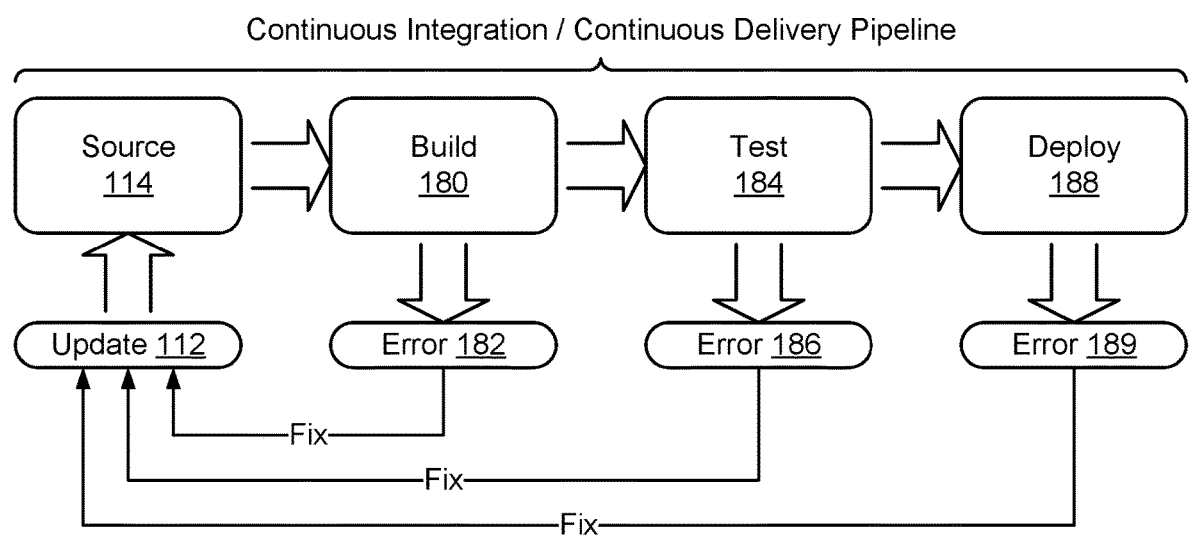
FIG. 3 is a functional block diagram of example continuous integration/continuous delivery pipeline implemented using the example software development environment of FIG. 2, according to some embodiments.

In some embodiments, the software development environment 102 includes a continuous integration tool 160. One example continuous integration tool 160 is Jenkins, available from www.jenkins.io, which is an open source automation server written in Java. The continuous integration tool 160 helps to automate the non-human part of the software development process, with continuous integration and facilitates technical aspects of continuous delivery. When an update 112 is created and committed in the version control system (source code management tool 120), the continuous integration tool 160 triggers and manages the build process (FIG. 3 block 180) and the testing process (FIG. 3 block 184). Other continuous integration tools 160 may be used as well, depending on the implementation, and the invention is not limited to an embodiment that interfaces with a software development environment 102 configured to use Jenkins as the continuous integration tool 160.

In some embodiments, the software development environment 102 includes a testing automation tool 170. One example testing automation tool 170 is Jenkins, which is described briefly above. Testing might involve, for example, security and unit testing, code style testing, integration testing, API tests, and UI tests. Any or all of these tests may detect errors that need to be fixed. When an update 112 is created and committed in the version control system (source code management tool 120), the continuous integration tool 160 triggers the testing automation tool 170 to initiate testing of the update 112, testing of the build process, and testing integration of the update 112 with the software 110. Testing can also be implemented on the update 112 prior to integration with the source code 114, to discover errors earlier in the development process. Other testing automation tools 170 may be used as well, depending on the implementation, and the invention is not limited to an embodiment that interfaces with a software development environment 102 configured to use Jenkins as the testing automation tool 170.

In some embodiments, the software development environment 102 implements a Continuous Integration (CI)/Continuous Delivery (CD) pipeline, which helps automate steps in a software delivery process, such as initiating code builds (FIG. 3 block 180), running automated tests (FIG. 3 block 184), and deploying to a staging or production environment (FIG. 3 block 188). Continuous Integration is a software development practice in which all developers merge code changes in a central repository several times a day. With continuous integration, each change in code triggers an automated build and test sequence for the given project, providing feedback to the developer or group of developers who made the change. Continuous delivery automates infrastructure provisioning and deployment to help streamline the entire process. As noted above, in some software development environments, the continuous integration tool 160 manages the CI/CD pipeline.

FIG. 3 is a flow diagram of an example CI/CD pipeline. As shown in FIG. 3, when an update 112 is added to source code 114, for example by committing the update 112 to the source code management tool 120, the continuous integration tool 160 will generate a build 180. It is possible that the build 180 may generate a build error 182. The error may be logged by error reporting tool 140 and tracked by the error reporting tool 140. Depending on the implementation, fixing the build error 182 may also generate a requirement to enter into the requirement tracking tool 150.

The build 180 will then be tested at block 184, for example using code coverage tool 130, testing automation tool 170, and other testing tools. Errors 186 detected during testing (FIG. 3 block 184) may be logged by error reporting tool 140 and tracked by the error reporting tool 140. Depending on the implementation, fixing the build error 186 may also generate a requirement to be entered into the requirement tracking tool 150.

Once the software is built (block 180) and tested (block 184), the software is deployed (block 188). Deployment (block 188) in FIG. 3 may include multiple steps, including release, deploy, operate, and monitoring of the software. Errors 189 may occur or be detected during the deployment phase (block 188), which may be logged by error reporting tool 140 and tracked by the error reporting tool 140. Depending on the implementation, fixing the deployment errors 189 may also generate requirements to be entered into the requirement tracking tool 150.

Software development or modification to an existing software product involves several stages. First, a developer creates the source code of update 112 that is to be added to the source code 114 of software 110. The source code of the update 112 may be related to a new feature or may change an existing feature of the software 110. When the source code of the update 112 is checked in, the CI/CD pipeline will move to the build stage (FIG. 3 block 180), where the revised code will be compiled (if necessary). The built code is then tested (FIG. 3 block 184) and, if it passes testing, may be deployed (FIG. 3 block 188).

As shown in FIG. 3, writing the source code for update 112 is only the first part of the process of creating an update. Frequently much additional work often needs to be done to fix errors in the source code of update 112 before the update 112 can be deployed. For example, as noted above, when update 112 is committed, there often are problems with the update 112 that will cause an error 182 in the build process 180 or an error 186 that will be detected during the testing process 184. Accordingly, additional work will then need to be done to modify the update 112 to fix the errors 182, 186 associated with the update. Unfortunately, the number of errors, the severity of the errors, and the amount of time it will take to correct the errors 182, 186 cannot be predicted in advance (before the update is created) using existing tools. When allocating resources between projects, not having an indication of the amount of effort that will be required can make it difficult for updates to be deployed 188 on schedule.

Figure 4:
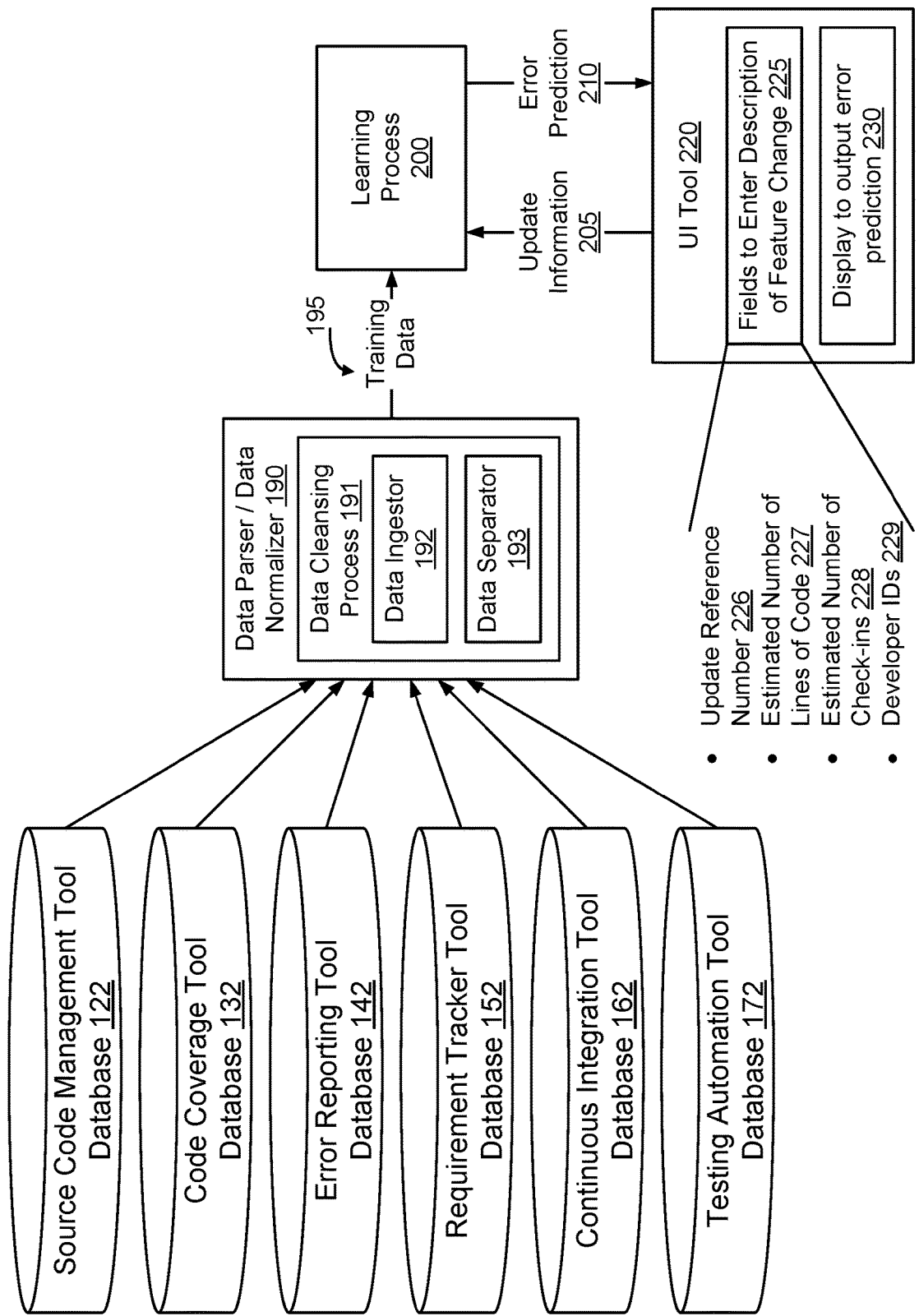
FIG. 4 is a functional block diagram of an error estimation system incorporating a learning process configured to predict several errors that are likely to occur and the severity of the errors that are likely to occur in a software update before the software update is created, using the continuous integration/continuous delivery pipeline of FIG. 3, according to some embodiments.

According to some embodiments, a learning process is trained using historical data about previous updates that were created using the software development environment 102. FIG. 4 shows an example embodiment in which historical data associated with previous updates is gleaned from a source code management tool database 122, a code coverage tool database 132, an error reporting tool database 142, a requirement tracker tool database 152, a continuous integration tool database 162, and a test automation tool database 172. Data about previous updates that were implemented using the software development environment 102 may come from other tools contained in the software development environment 102 as well.

In some embodiments, a data parser/data normalizer 190 cleanses the data from the various sources prepare the data for input to the learning process. As shown in FIG. 4, in some embodiments the data parser/normalizer 180 includes a data cleansing process 191, which includes a data injestor 192 and a data separator 193. In some embodiments, data cleansing implemented by the data cleansing process 191 includes importing data from the multiple sources, merging the data sets, rebuilding missing data, standardizing the data, normalizing the data, de-duplicating the data, and optionally verifying and enriching the data. The particular functions performed on the data to get the data cleansed and ready to be input to the learning process 200 will depend on the particular implementation. For example, the types of cleansing processes may depend on the number of databases, the manner in which the data is stored in each of the databases, the attributes of the records stored in the databases, and numerous other aspects as would be appreciated by a person of ordinary skill in the art.

Data from the various sources is obtained by a data parser/data normalizer 190 and then input as training data 195 to a learning process 200. In some embodiments, the learning process 200 is a deep neural network configured to implement a k-nearest neighbor linear regression algorithm. Once trained, information describing a proposed to-be-created update may be input to a User Interface (UI) tool 220, and update information 205 associated with the input information is then provided to the learning process 200. The update information 205 describing the proposed update, in some embodiments, includes information about the update that is to be created, but has not yet been created. The update information 205, in some embodiments, includes attributes that describe the future update that are the same type of attributes that were used to train the learning process. For example, if the learning process was trained using a complexity attribute of previous updates (i.e. number of lines of code of previous update and number of check-ins), and was trained to determine a correlation between update complexity with update error rate and severity, then in some embodiments the update information 205 describing the future update also includes an estimated complexity (i.e. estimated number of lines of code and estimated number of check-ins). This information 205 is then used by the learning process 200 to generate an error prediction 210 that specifies an anticipated estimate of the number of errors and the expected severity of those errors that would be expected to occur during the development process of the update that is to be developed.

By formatting the update information 205 describing the update that is to be created using the attributes that were used to train the learning process 200, the learning process 200 can be used to provide as output 210 a predicted number of errors that would be expected to occur during the build (FIG. 3 block 180) and test phases (FIG. 3 block 184) once the update associated with the feature change has been created and committed within the software development environment 102. By having a prediction of the number of expected errors, it is possible to more accurately assign the correct number of resources (software developers) to work on creating the update, so that the update can be deployed (FIG. 3 block 188) on time.

In some embodiments, data collected from the databases 122, 132, 142, 152, 162, and 172 shown in FIG. 4 describes aspects of the previous updates that were implemented in software development environment 102. There are multiple types of data that may be collected, depending on the implementation. Several of the types of data are described briefly below.

In some embodiments, the data parser/data normalizer 190 collects the requirement ID of the previous updates. In some embodiments the requirement ID is consistent across each of the databases 122, 132, 142, 152, 162, and 172 shown in FIG. 4, and enables each of the databases to identify an entry in the respective database with the previous update. Since each of the databases might have different types of information about the various updates, in some embodiments the requirement ID is used by the data parser/data normalizer 190 to combine information about the previous updates from multiple source databases into a unified update record.

In some embodiments, the data parser/data normalizer 190 collects information from the databases related to an initial estimated amount of time it would take to deliver the entire update (from start to deploy), as well as the actual time that it took to deliver the entire update. In some embodiments, this information is available from the requirements tracker tool database. In some embodiments, the learning process 200 can learn a correlation between these two values, as well as correlating that with an employee ID of the person that performed the initial estimate. By learning this correlation, when provided with an estimate for an update to be created and an employee ID of the person that generated the estimate total amount of time for the future update, the learning process can output a more accurate estimated total amount of time that should be expected to be expended, from start to deploy, to deliver the entire update.

In some embodiments, the data parser/data normalizer 190 collects information related to the total number of lines of code of the entire update, as well as the number of check-in/commits/change sets required to complete the entire update. In some embodiments, this information is available from the source code management tool database 122. In some embodiments, the complexity may also be based in part on whether the update required any change or upgrade in infrastructure to be implemented in connection with generation/deployment of the update.

In some embodiments, the total number of lines of code of the entire update, combined with the number of check-in/commits/change sets represents a complexity attribute of the previous update. In some embodiments, the learning process is trained using this complexity attribute to learn a correlation between the complexity of the previous update and the number and severity of errors associated with the previous update. When trained with this correlation, if the learning process 200 is provided with a complexity attribute of an update to be created (arrow 205), the learning process can use this previously learned correlation to provide an estimated error prediction (arrow 210) about the number and severity of the errors that would be expected to be encountered during the development process of the update that is to be created.

In some embodiments, the data parser/data normalizer 190 collects information related to the total number of errors for the entire update, as well as where the errors occurred. In some embodiments, this information is available from the error reporting tool database 142, the code coverage tool database 132, the continuous integration tool database 162, and/or the testing automation tool database 172. For example, in some embodiments the data parser/data normalizer 190 collects information related to the total number of bugs for the entire update. The number of code bugs during pre-commit, post-commit, Quality Assurance, and Release; the number of bugs in infrastructure during build, release, and installation; and the severity of the defects raised. As noted above, in some embodiments the learning process 200 learns a correlation between the complexity of the update and the number and type of errors that were encountered in the previous update, and is configured to use this learned correlation to predict the type and complexity of errors that are likely to occur in connection with a proposed update that is yet to be created.

In some embodiments, the data parser/data normalizer 190 collects information related to details of individuals who worked on each of the previous updates and the individuals who worked on fixing errors associated with each of the previous updates. For example, in some embodiments the identity of software developers that worked on the updates is maintained in one or more of the databases shown in FIG. 4, and the learning process learns a correlation between the individuals and one or more of the other variables to enhance the prediction as to the number of predicted errors. For example, employee #233 may have a history of working on updates with very low error rates, whereas employee #884 may have a history of working on updates with relatively higher error rates. This can be used to adjust error prediction 210 based on who is assigned to work on the update described in update information 205.

Although several types of data were described that may be collected by the data parser/data normalizer 190, in other implementations the data parser/data normalizer 190 collects less data or different types of data and, accordingly, the type of data collected by the data parser/data normalizer 190 will depend on the particular implementation.

In some embodiments, the learning process 200 is a deep neural network that is trained using a supervised machine learning process. The historical data collected by data parser/data normalizer 190 is passed to the learning process 200 as training data 195. In some embodiments, the training data 195 is used to train a k-nearest neighbor linear regression algorithm in learning process 200 to enable the learning process 200 to learn dependencies between variables of the software development process from the training data. In some embodiments the training data 195 is used both to train the learning process 200 and to test the learning process 200. For example, the training data 195 may be split between training and testing using a ratio of 8:2 or 7:3, to enable the learning process 200 to be provided with feedback (testing) during the training process.

In some embodiments, the learning process 200 uses a k-nearest neighbors linear regression algorithm, in which the input used by the learning process 200 is the k closet training examples in the feature space, and the output is the average of the values of the k nearest neighbors.

In some embodiments, the learning process is trained to learn a correlation between one or more independent variables and one or more dependent variables. In some embodiments, the independent variables include the requirement complexity of previous updates and individual contributor's average performance, and the dependent variables are the number of OPTs (errors), the severity of the errors, and the amount of time it will take to fix the errors. In some embodiments, the number of OPTs includes the number of errors in the development environment, number of errors in the build process, and number of errors that occur in the DevOps environment. In some embodiments, the DevOps environment includes the software development environment 102 described in greater detail herein, as well as an operations environment that is used to release, deploy, operate, and monitor the software once the update has been completed. In FIG. 3, this is shown as "deploy 188" but in practice the OPS portion of the DevOps environment includes additional software that enables the released software to be monitored to capture errors that occur and are reported once the software has been deployed.

In some embodiments, a user interface tool 220 is provided, that is configured to obtain information about an update to be developed. For example, the user interface tool may have entry fields 225 configured to receive information about the complexity of the update to be developed. As noted above, the complexity of the update to be developed may include an estimated number of lines of code, an estimated number of check-ins, whether any infrastructure change will be made in connection with the update, the employee ID of the person performing the initial estimates, and the employee IDs of the team of software developers that are expected to work on the update.

In some embodiments, the fields to enter the description of the feature change 225 include a field 226 for the update reference number, a field 227 to enable an estimate of the number of lines of code to be entered, a field 228 to enable an estimate of the number of check-ins for the update, and a field 229 to enable the developers assigned to the update to be input. Other fields and additional fields may likewise be included in fields 225 depending on the embodiment. In some embodiments, the fields 225 will include a field to enter information related to each aspect that learning process has been trained on. For example, if the learning process has learned a correlation between 5 individual aspects of previous updates and the number of errors that occurred in connection with those updates, then the fields 225 of UI tool 220 include corresponding input fields to enable the same 5 individual aspects of the current update to be entered. Accordingly, in some embodiments the fields provided via UI tool 220 correspond to the type of information required by learning process 200 to enable the learning process 200 to predict the number of errors that are likely to occur in connection with the current update.

Once this information has been entered in to the UI tool 220, the UI tool formats the information and forwards it as update information 205 to the trained learning process 200. Trained learning process uses the update information 205 to generate an error prediction 210, that is provided to UI tool 220, and displayed by UI tool 230. In some embodiments, the error prediction 210 includes a number of errors that are likely to occur, the severity of the errors, and the amount of software developer time that will likely be required to be expended to fix the anticipated errors. In some embodiments, the error prediction 210 is also used to automatically increase the number of software developers assigned to the team to enable the update to be appropriately staffed to be delivered on a target timeline.

FIG. 5 is a flow chart of a process of predicting several errors that are likely to occur and the severity of the errors that are likely to occur in a software update before the software update is created. As shown in FIG. 5, in some embodiments the process includes obtaining data about previous updates from tools of a CI/CD pipeline that are expected to be used to implement the software development environment that will be used to create the new update (block 500). That data from the tools is parsed/cleansed to normalize the data for input to a learning process (block 502). In some embodiments, parsing the data includes obtaining different aspects of data from different tools that are implementing the software development environment, and correlating data from the different tools into one data entry for a given previous update.

The parsed/cleansed data is used as training input to the learning process 200 (block 504). In some embodiments, only some aspects of the data has a strong correlation with how many errors occurred in connection with creation of the previous updates. In some embodiments, only the aspects of the parsed data that has a strong correlation with the occurrence of errors in the previous updates is provided as training data to the learning process. For example, a strong correlation between the complexity of the previous update and the number of errors in the previous update has been found, and in some embodiments this information is provided to the learning process to enable the learning process 200 to learn this correlation in a supervised manner. In some embodiments, a portion of the parsed data is used to test the learning process 200, during training, to assist the learning process 200 to converge to a trained state (block 506). In some embodiments, approximately 20%-30% of the parsed data is used in the testing portion of the supervised learning process.

As training data is provided to the learning process 200 (block 504) and the learning process is tested (block 506), a determination is periodically made as to whether the learning process is sufficiently trained (block 508). Specifically, in some embodiments a determination is made as to whether the learning process has a sufficiently correlated structure between the previous complexity of the previous updates and the number and types of errors that occurred in connection with creation of the previous updates. If the learning process 200 is not sufficiently trained (a determination of NO at block 508) the training process continues using additional parsed data.

If the learning process 200 is determined to be sufficiently trained (a determination of YES at block 508), the learning process 200 is ready to be used in predictive manner (block 510) to generate information 210 relating to a predicted number of error, error type, and error severity, as well as an amount of time that it would be expected to take to fix the errors, for a proposed update, prior to creation of the proposed update.

While update is being built and going through the build (FIG. 3 block 180) and test (FIG. 3 block 184) phases, and before being deployed (FIG. 3, block 188), the number of errors that have been found in the current update may be collected (FIG. 5, block 512) and passed back to the learning process (arrow 520). In particular, in some embodiments the GUI is used to receive information about errors detected in the update as the update is being developed. The GUI passes this information (arrow 520) to the learning process and uses the learning process to determine: (1) an estimate of an amount of time to fix the errors that have been identified in the current update; (2) an estimate of a number of additional errors that are likely to occur in connection with completion of the current update; and (3) an estimate of an amount of time (number of software developer hours) that it will take to complete the current update. By having the estimate of how long it will take to complete the current update, given current staffing levels, a decision can be made as to how many additional software developers should be assigned to the current update to enable the current update to be completed on time. Accordingly, in some embodiments, the learning process is used during the process of completing an update as well as before the update is started, to enable the learning process to provide updated completion estimates throughout the course of the process of planning and implementing the update.

In some embodiments, once the proposed update has been created and deployed, information about the actual number of errors, the type of errors, the severity of the errors, and the amount of time it took to correct the errors, is collected (block 514). In some embodiments, the information collected from the update is passed back to the parsing process 190, and used by the parsing process to provide feedback to the learning process 200 (block 516). By providing this feedback (arrow 518 in FIG. 5), the learning process 200 is provided with information as to the number/type/severity of errors that occurred while the update was created. This can be compared with the number/type/severity of errors that had been predicted by the learning process 200 before the update was created, to adjust the manner in which the learning process 200 makes future error predictions for subsequent future updates.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on one or more non-transitory tangible computer readable storage mediums. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for implementing a method of predicting a number of errors that are likely to occur and severity of the errors that are likely to occur in a proposed software update before the proposed software update is created, the computer program comprising a set of instructions which, when executed by a computer, cause the computer to perform a method comprising the steps of:
receiving data from a plurality of tools of a software development environment, the data including at least complexity information of previous software updates and error occurrence information of the previous software updates;
using the data to train a learning process, to cause the learning process to learn a correlation between the complexity information of the previous software updates and the error occurrence information of the previous software updates;
providing the trained learning process with an expected complexity information of the proposed software update; and
receiving from the trained learning process the number of errors that are likely to occur and severity of the errors that are likely to occur while of creating the proposed software update before the proposed software update is created;
wherein the complexity information of the previous software updates includes, for each previous software update that is used to train the learning process, a number of lines of code of the previous software update and a number of check-in operations that occurred in connection with creation of the previous software update;
wherein the complexity information of the previous software updates includes, for each previous software update that is used to train the learning process, first developer information identifying who worked on the previous software update;
wherein the expected complexity information includes second developer information identifying which software developers are expected to work on the proposed software update; and
wherein the step of using the data to train the learning process comprises using the first developer information to train the learning process to learn a correlation between developer information and error occurrence information, and wherein the trained learning process uses the learned correlation between developer information and error occurrence information, and the second developer information, to generate the number of errors that are likely to occur and the severity of the errors that are likely to occur while creating the proposed software update.

2. The non-transitory tangible computer readable storage medium of claim 1, wherein the plurality of tools includes a requirement tracker tool having a first database, an error reporting tool having a second database, and a testing automation tool having a third database, and wherein the data is received from each of the first database, second database, and third database.

3. The non-transitory tangible computer readable storage medium of claim 1, wherein the step of receiving data from the plurality of tools comprises cleansing the data prior to using the data to train the learning process.

4. The non-transitory tangible computer readable storage medium of claim 1, wherein the learning process implements a k-nearest neighbors linear regression algorithm.

5. The non-transitory tangible computer readable storage medium of claim 1, wherein the error occurrence information includes, for each previous software update that is used to train the learning process, a number of errors that occurred in connection with creation of the previous software update, information about the severity of the errors that occurred in connection with creation of the previous software update, and an amount of time required to correct the errors that occurred in connection with creation of the previous software update.

6. The non-transitory tangible computer readable storage medium of claim 1, wherein the expected complexity information includes an expected number of lines of code of the proposed software update and an expected number of check-in operations that are anticipated to occur in connection with creation of the proposed software update.

7. The non-transitory tangible computer readable storage medium of claim 6, wherein the step of receiving, from the trained learning process, the number of errors that are likely to occur and severity of the errors that are likely to occur, further comprises receiving, from the trained learning process, an estimate of an amount of time required to correct errors that are anticipated to occur in connection with creation of the proposed software update.

8. The non-transitory tangible computer readable storage medium of claim 1, further comprising providing the trained learning process with second expected complexity information of the proposed software update after creation of the proposed software update has been started, and receiving from the trained learning process a revised expected number of errors that are likely to occur and severity of the errors that are likely to occur while finishing the proposed software update.

9. The non-transitory tangible computer readable storage medium of claim 8, wherein the step of receiving, from the trained learning process, the revised expected number of errors that are likely to occur and severity of the errors that are likely to occur, further comprises receiving, from the trained learning process, an estimate of time required to correct errors that are anticipated to occur in connection with finishing the proposed software update.

10. The non-transitory tangible computer readable storage medium of claim 1, further comprising generating, by the trained learning process, an error estimate, the error estimate including the number of errors that are likely to occur and severity of the errors that are likely to occur while creating the proposed software update before the proposed software update is created.

11. The non-transitory tangible computer readable storage medium of claim 10, wherein the error estimate further includes an estimated amount of software developer time that is likely to be required to fix the errors that are likely to occur while creating the proposed software update.

12. A method, comprising:
receiving data from a plurality of tools of a software development environment, the data including at least complexity information of previous software updates and error occurrence information of the previous software updates;
training a learning process, using the data, to cause the learning process to learn a correlation between the complexity information of the previous software updates and the error occurrence information of the previous software updates;
receiving, by the trained learning process, an expected complexity information of the proposed software update; and
generating, by the trained learning process, an error estimate for the proposed software update before the proposed software update is created, the error estimate including a number of errors that are likely to occur and severity of the errors that are likely to occur while creating a proposed software update;
wherein the complexity information of the previous software updates includes, for each previous software update that is used to train the learning process, a number of lines of code of the previous software update and a number of check-in operations that occurred in connection with creation of the previous software update;
wherein the complexity information of the previous software updates includes, for each previous software update that is used to train the learning process, first developer information identifying who worked on the previous software update;
wherein the expected complexity information includes second developer information identifying which software developers are expected to work on the proposed software update; and
wherein the step of using the data to train the learning process comprises using the first developer information to train the learning process to learn a correlation between developer information and error occurrence information, and wherein the trained learning process uses the learned correlation between developer information and error occurrence information, and the second developer information, to generate the number of errors that are likely to occur and the severity of the errors that are likely to occur while creating the proposed software update.

13. The method of claim 12, wherein the error estimate further includes an estimated amount of software developer time that is likely to be required to fix the errors that are likely to occur while creating the proposed software update.

14. The method of claim 12, wherein the learning process implements a k-nearest neighbors linear regression algorithm.

15. The method of claim 12, wherein the error occurrence information includes, for each previous software update that is used to train the learning process, a number of errors that occurred in connection with creation of the previous software update, information about the severity of the errors that occurred in connection with creation of the previous software update, and an amount of time required to correct the errors that occurred in connection with creation of the previous software update.

16. The method of claim 12, wherein:
the plurality of tools includes a requirement tracker tool having a first database, an error reporting tool having a second database, and a testing automation tool having a third database, and wherein the data is received from each of the first database, second database, and third database; and
wherein the step of receiving data from the plurality of tools comprises cleansing the data prior to using the data to train the learning process.

17. The method of claim 12, wherein the expected complexity information includes an expected number of lines of code of the proposed software update and an expected number of check-in operations that are anticipated to occur in connection with creation of the proposed software update.

18. The method of claim 12, wherein the error estimate further includes an estimate of an amount of time required to correct errors that are anticipated to occur in connection with creation of the proposed software update.

19. The method of claim 12, further comprising providing the trained learning process with second expected complexity information of the proposed software update after creation of the proposed software update has been started, and receiving from the trained learning process a revised expected number of errors that are likely to occur, a severity of the errors that are likely to occur while finishing the proposed software update, and an estimate of time required to correct errors that are anticipated to occur in connection with finishing the proposed software update.

* * * * *